US007901811B2

United States Patent
Hambitzer et al.

(10) Patent No.: US 7,901,811 B2
(45) Date of Patent: Mar. 8, 2011

(54) RECHARGEABLE ELECTROCHEMICAL BATTERY CELL

(75) Inventors: Guenther Hambitzer, Pfinztal (DE);
Claudia Wollfarth, Karlsruhe (DE);
Ingo Stassen, Dresdan (DE); Klaus Schorb, Rheinstetten-Forchheim (DE);
Christiane Ripp, Pfinztal (DE)

(73) Assignee: G. Hambitzer, Bonn (DE)

(*) Notice: Subject to any disclaimer, the term of this patent is extended or adjusted under 35 U.S.C. 154(b) by 1143 days.

(21) Appl. No.: 10/501,760

(22) PCT Filed: Jan. 16, 2003

(86) PCT No.: PCT/DE03/00103
§ 371 (c)(1),
(2), (4) Date: Jul. 19, 2004

(87) PCT Pub. No.: WO03/061036
PCT Pub. Date: Jul. 24, 2003

(65) Prior Publication Data
US 2005/0106467 A1    May 19, 2005

(30) Foreign Application Priority Data
Jan. 19, 2002    (DE) ................... 102 01 936

(51) Int. Cl.
*H01M 4/62* (2006.01)
*H01M 4/38* (2006.01)
*H01M 4/66* (2006.01)
*H01M 4/70* (2006.01)
*H01M 10/536* (2006.01)

(52) U.S. Cl. .......... 429/232; 429/231.95; 429/233; 429/235; 429/346

(58) Field of Classification Search .......... None
See application file for complete search history.

(56) References Cited

U.S. PATENT DOCUMENTS

| 6,709,789 B1* | 3/2004 | Hambitzer et al. | 429/346 |
| 6,730,441 B1* | 5/2004 | Hambitzer et al. | 429/346 |
| 2002/0102456 A1* | 8/2002 | Aihara et al. | 429/144 |
| 2003/0003364 A1 | 1/2003 | Mori et al. | |

FOREIGN PATENT DOCUMENTS

| JP | 60230367 A | 11/1985 |
| JP | 63303877 A1 | 12/1988 |

(Continued)

OTHER PUBLICATIONS

Certified translation of JP 60-230367, Nov. 1985.*

*Primary Examiner* — Jonathan Crepeau
(74) *Attorney, Agent, or Firm* — Rothwell, Figg, Ernst & Manbeck, P.C.

(57) ABSTRACT

The invention relates to a rechargeable electrochemical battery cell. Said cell comprises a negative electrode (5), an electrolyte (19), and a positive electrode, the negative electrode (5) having a an electronically conductive substrate (14), onto which an active mass (15) is electrolytically deposited during the charging of the cell. The aim of the invention is to significantly improve the operational safety of said cell. To achieve this, the cell in contact with the substrate (14) of the negative electrode (5) has a porous structure (16) formed by solid particles (17), which is configured and positioned in such a way that the active mass (15), which is deposited during the charging of the cell, penetrates from the surface of the substrate (14) into the pores (18) of the latter and is deposited again therein.

30 Claims, 3 Drawing Sheets

FOREIGN PATENT DOCUMENTS

Figure 1:
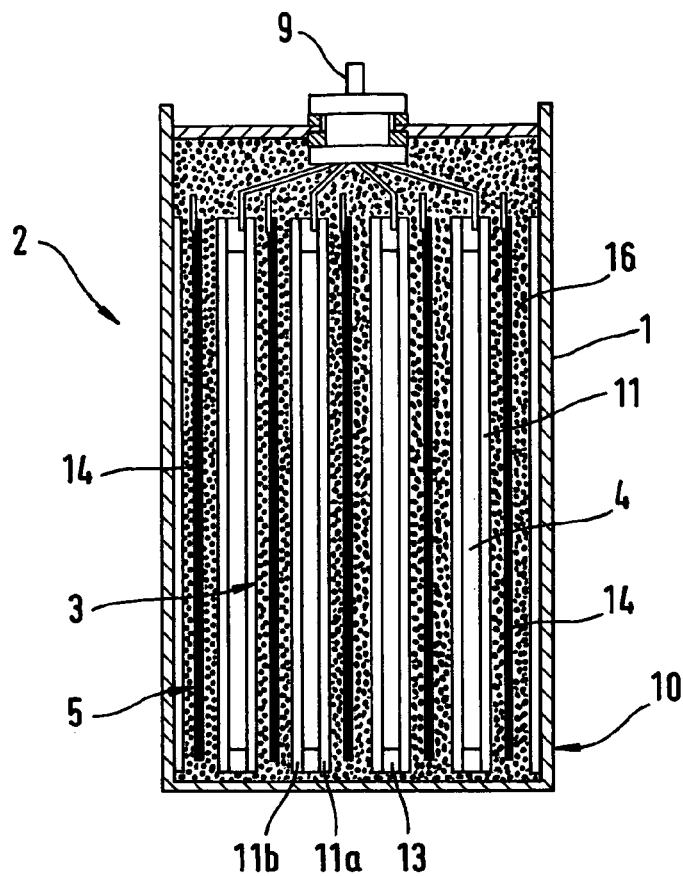

| | | | |
|---|---|---|---|
| JP | 9134720 | A | 5/1997 |
| JP | 2000173595 | A1 | 6/2000 |
| JP | 2001052758 | A1 | 2/2001 |
| JP | 2002373707 | A1 | 12/2002 |
| WO | WO 00/44061 | A1 | 7/2000 |
| WO | WO 00/79631 | A1 | 12/2000 |
| WO | WO 02/09213 | A1 | 1/2002 |

* cited by examiner

RECHARGEABLE ELECTROCHEMICAL BATTERY CELL

CROSS REFERENCE TO RELATED APPLICATION

This application is a 35 USC § 371 National Phase Entry Application from PCT/DE03/00103, filed Jan. 16, 2003, and designating the U.S.

The invention relates to a rechargeable electrochemical battery cell, preferably nonaqueous, having a negative electrode, an electrolyte and a positive electrode, in which at least one of the electrodes has a (typically flat) electronically conducting substrate having a surface on which an active mass is electrolytically deposited during charging of the cell.

Important examples include alkali metal cells, in which the active mass is an alkali metal which is deposited on the negative electrode when the cell is charged. The present invention is directed in particular to a battery cell in which the active mass is a metal, in particular an alkali metal, an alkaline earth metal or a metal of the second subgroup of the periodic system, lithium being especially preferred.

The electrolyte used within the scope of the present invention is preferably based on $SO_2$. The term "$SO_2$-based electrolyte" is understood to refer to electrolytes which contain $SO_2$ not only as an additive in a low concentration. Rather the mobility of the ions of the conductive salt, which is contained in the electrolyte and is responsible for the charge transport, is at least in part due to the $SO_2$. In the case of an alkali metal cell, the conductive salt is preferably a tetrahalo-aluminate of the alkali metal, e.g., $LiAlCl_4$. An alkali metal cell having an electrolyte based on $SO_2$ is referred to as an "alkali metal-$SO_2$ cell".

The required safety is an important problem of battery cells. In particular, high temperatures may lead to safety-critical states of many types of cells. It may happen that the cell housing ruptures or at least becomes leaky, and harmful gaseous or solid substances or even fire may escape. A rapid increase in temperature can be caused not only by improper handling but also by internal or external short circuits occurring in operation of the cell.

Especially critical battery cells are those in which a drastic increase of the temperature in the interior of the cell causes an increase of exothermic reactions, which in turn leads to a further increase in temperature. This self-potentiating effect is referred to as "thermal runaway" by those skilled in the art.

Battery manufacturers attempt to prevent any "thermal runaway" by controlling the charging and/or discharging circuit by electronic, mechanical or chemical means, so that the flow of electric current is interrupted at temperatures below a critical level. To this end, for example, pressure-sensitive mechanical or temperature-sensitive electronic switches are integrated into the internal battery circuit. In addition, there has been discussion of irreversibly interrupting, as soon as a critical temperature threshold is reached, the flow of current within these components by means of chemical reactions in the electrolyte or mechanical changes in the battery separator.

Despite these measures, the safety standard of many battery cells is not fully satisfactory. For example, lithium ion cells are used only with complicated electronic monitoring, because on the basis of the current state of the art, the safety risks are very high.

The present invention address the problem to improve the function, particularly the safety, of electrochemical battery cells in a simple and cost-effective way.

This aim is achieved for a battery cell of the type described above in that it has, in contact with the substrate of the negative electrode, a porous structure made of solid particles, which is formed and positioned in such a manner that the active mass deposited during charging of the cell penetrates from the surface of the substrate into its pores and is further deposited therein.

In the scope of the present invention, it has been found that significant improvements of the function of electrochemical battery cells are achieved if a microporous structure is provided in direct contact with the electronically conductive substrate and the pore size of the structure is dimensioned in such a manner that the active mass deposited during the charging procedure grows into its pores in a controlled manner. Preferably the pores are completely filled by the active mass growing into the porous structure, so that the active mass is in contact with the electrolyte essentially only via the relatively small area of the boundary layers at which the further deposition occurs.

If the active mass is in contact with the electrolyte only via a relatively small contact area, the electrolytic conduction must take place through the narrow pores of the porous particle structure. Initially, this appears to be disadvantageous for the function of the cell:

Because of the narrow pores, an increase of the electrolytic resistance in the cell, with corresponding reduction of the maximum charging and/or discharging currents, had to be expected.

The reduced mobility of the electrolyte ions gives rise to a concern regarding the formation of a concentration gradient, which would lead to a voltage drop.

In addition, it initially appears disadvantageous that the porous structure of the solid particles increases the weight and volume of the cell but provides no direct contribution to the cell reaction which reaction is decisive for the capacity of the cell. This runs against the general aim of battery development, which is to achieve the highest possible battery capacity with the smallest possible weight and volume.

In the scope of the present invention it has been determined that contrary to these considerations, the overall function of the cell is significantly improved.

The cell safety is significantly increased in a simple manner using means which may be integrated well and cost-effectively into the manufacturing process of a battery. Even during nail tests and temperature load tests, which simulate extreme mishandling of the cell (as would not normally arise in practice), no safety-critical increase of temperature or pressure or even flames were observed. It is possible to enclose the substrate of the negative electrode completely with the porous structure. Therefore the safety effect is independent of the point of the cell at which a safety-critical state occurs (for example, due to mechanical damage). It has been determined that the active mass in the porous structure grows during charging and/or shrinks again during discharging in a controlled and largely uniform way. Problems which are to be attributed to the formation of a coating (which consists of $Li_2S_2O_4$ in the exemplary case of a lithium cell), are reduced. In addition, better dissipation of the reaction heat of exothermal reactions in the cell is achieved. No elevation of the cell resistance which is significant for the practical use of the cell was observed.

On the basis of the experimental investigations performed during the testing of the present invention, it is to be assumed that its advantageous effect is mainly due to prevention of a non-uniform growth of the active mass during the charging of the cell. Normally, the active mass is deposited on the surface of the substrate in filamentous shapes which are designated as "whiskers" or "dendrites". Irregularity of the growth is caused, mainly after multiple charging and discharging cycles of the cell, by minimal inhomogeneities, for example in the surface of the substrate or in regard to the electrolyte distribution. Such irregularity increases from cycle to cycle. Essential safety-relevant disadvantages are caused thereby:

The large surface of the irregular deposition accelerates uncontrolled safety-relevant reactions.

The large surface also supports self-discharge reactions, which lead to the formation of a coating on the surface of the active mass.

Furthermore irreversible reactions are supported (the formation of dead lithium in the case of a lithium cell, for example) which lead to a gradual reduction of the cell capacity.

These problems are avoided by the present invention.

Also the fact that the electrolyte volume in the cell is reduced by the present invention has proven to be advantageous overall. The present invention can therefore be used especially advantageously in connection with a battery cell according to International Patent Application WO 00/79631 A1, which may be operated using a very small quantity of electrolyte. This is a cell with a negative electrode containing, in the charged state, an active metal, particularly an alkali metal, with an electrolyte based on sulfur dioxide, and with a positive electrode which contains the active metal and from which ions exit into the electrolyte during the charging procedure. The electrolyte is based on sulfur dioxide. At the negative electrode a self-discharge reaction occurs, in which the sulfur dioxide of the electrolyte reacts with the active metal of the negative electrode to form a poorly-soluble compound. According to the invention described in the International Patent Application, the electrochemical charge quantity of the sulfur dioxide contained in the cell, calculated at one Faraday per mole of sulfur dioxide, is less than the electrochemical charge quantity of the active metal theoretically storable in the positive electrode. Therefore, the battery cell can be operated with a significantly reduced quantity of electrolyte and nonetheless has an improved function. With regard to further details reference is made to the document cited. Its content is incorporated herein by reference.

According to the present invention, the structure of a layer directly adjoining the substrate of the negative electrode is determined by the size and shape of its solid particles, which are also referred to hereafter as "structure-forming particles". The porous structure may be formed both by particles which are not bonded to one another or by a particle composite. If a binder is provided in the porous structure for manufacturing a particle composite, the share of the binder should not be too high, namely less than 50%, preferably less than 30%, of the total solid volume of the porous structure. The binder proportion is preferably so low that the binder is only seated in the region of the contact points between the structure-forming particles. To this end binder proportions (volume ratio of the binder to the total volume of the structure-forming particles) of less than 20% or even less than 10% are especially preferred.

If the structure-forming particles are bonded into a particle composite, this bond should have a certain elasticity. In particular, a particle composite produced by sintering is too rigid, because the mechanical strain in the porous structure during operation of the cell may lead to breaks, which deteriorate the safety properties of the battery cell.

In this respect a porous structure made of particles which are not bonded to one another is advantageous because the forces and tensions arising during charging and discharging of the cell may be absorbed more uniformly, without breaks or cracks. In this case, however, the structure-forming particles should be packed so closely that they cannot move inside the structure during operation of the cell.

In order to achieve this immobility of the particles and to achieve the desired controlled deposition of the active mass in the porous structure, with largely complete filling of its pores, the volume filling proportion of the solid components of the porous structure (percent ratio between the solid volume and the total volume of the porous structure) should be high. It should at least be 40%, preferably at least 50%, especially preferably at least 55%. These values are higher than the volume filling proportion of typical bulk layers made of (normally crystalline) solid particles. The desired more compact structure may be achieved using different methods:

The density (and therefore the volume filling proportion) of a loose bulk layer may be increased by mechanical concussion (striking, shaking, or stamping) to values above the bulk density characteristic for the particular particles. According to the experimental testing of the present invention, such methods can be integrated cost-effectively into the manufacturing process of battery cells.

The volume filling proportion is to a substantial degree a function of the shape of the structure-forming particles. Preferably, a particle shape which approximates a sphere is used to produce the porous structure, whereby their bulk density is higher than the bulk density of the same substance in crystalline form.

An increased volume filling proportion may also be achieved if the porous structure contains two fractions of structure-forming solid particles having defined different average particle sizes, the particle sizes of the fractions supplementing one another in such a manner that an increased volume filling proportion results. Preferably, the structure-forming particles of the finer fraction are deposited in the spaces between the particles of the coarser fraction, whereby an especially high volume filling proportion can be achieved.

Of course, the described methods can be used in combination with one another in order to achieve an especially high volume filling proportion.

The structure-forming solid particles are preferably made of a material which is inert in relation to the electrolyte, its overcharge products, and the active mass. For example, ceramic powders, and in some circumstances particles made of amorphous materials, particularly glasses, are suitable, while tonically disassociating materials (salts) should not be used for the structure-forming components. In any case, the material of the structure-forming solid particles should have a sufficiently high melting point of at least 200° C., preferably at least 400° C.

Compounds which do not contain oxygen, in particular carbides, nitrides, or phosphides, are especially suitable from a safety viewpoint. Carbides, nitrides, or phosphides of the fourth main group of the periodic system, in particular of silicon, have proven to be especially suitable. Silicon carbide is especially suitable because of its good availability and its high thermal conductivity. In general, compounds having a high thermal conductivity of at least 5 W/mK, preferably at least 20 W/mK are preferred. In specific cases, the use of oxygen-containing compounds may also be advantageous. This is in particular true for $SiO_2$, which is available cost-effectively, also in spherical shape.

Figure 3:
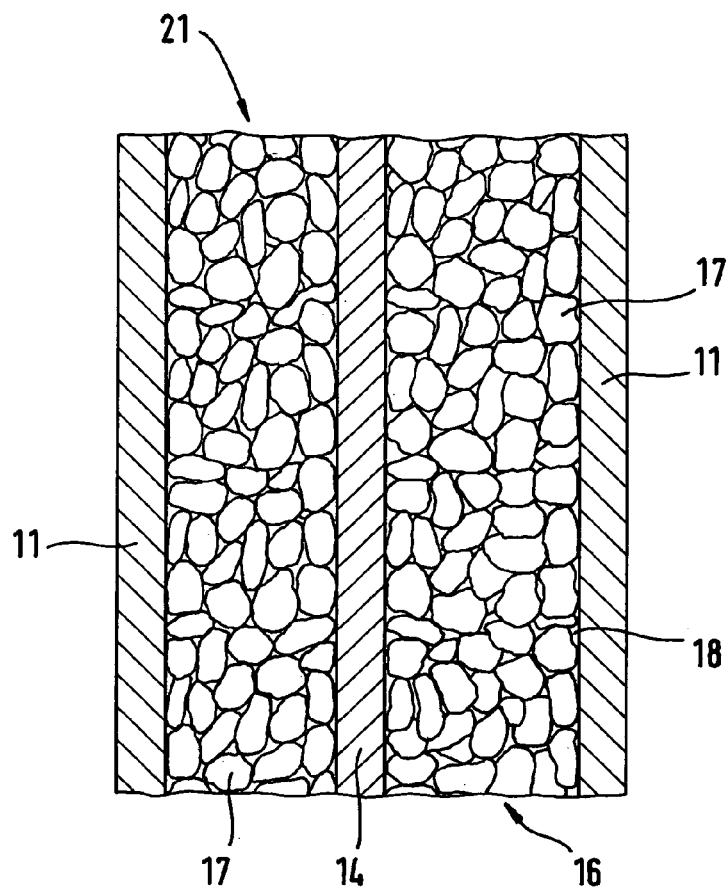
Figure 4:
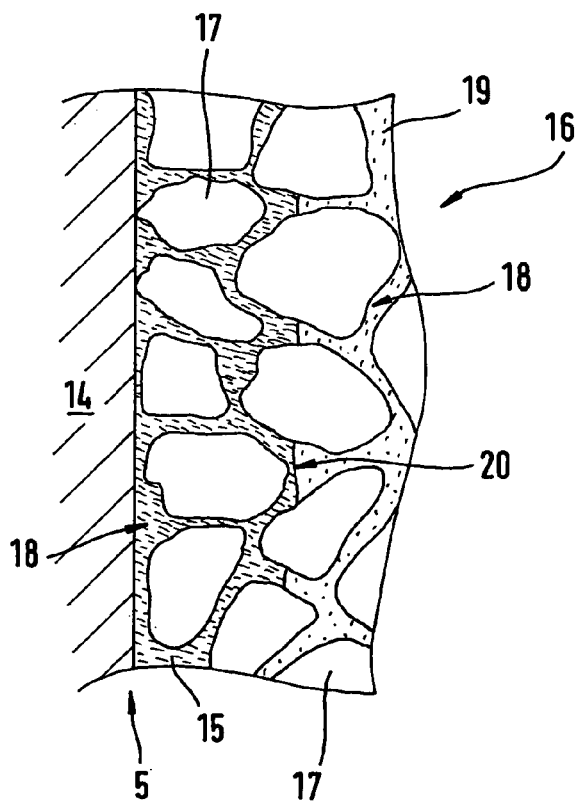
Figure 5:
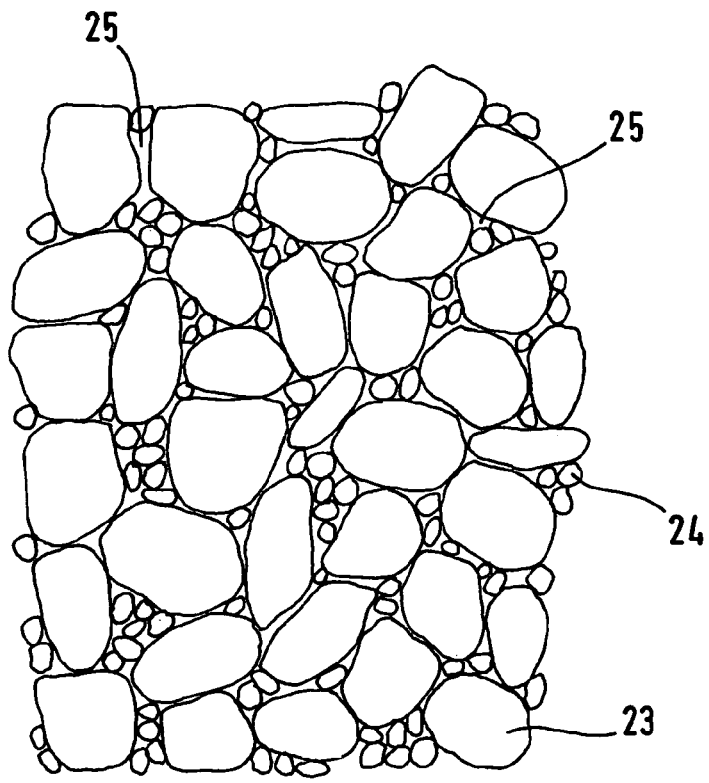
Figure 6:
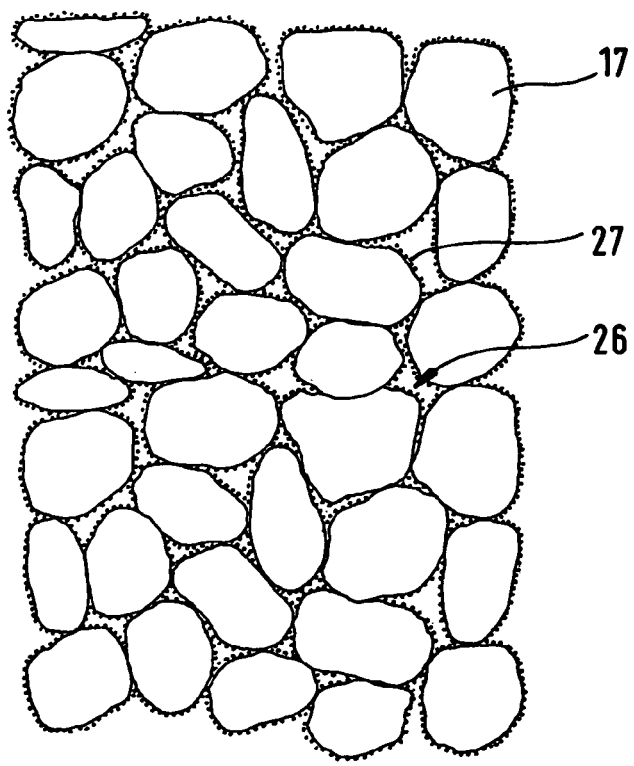

The present invention will be explained in greater detail hereafter on the basis of exemplary embodiments illustrated in the figures. The features described therein may be used individually or in combination to provide preferred embodiments of the present invention. In the figures FIG. 1 shows a cross-sectional illustration of a battery cell according to the present invention, FIG. 2 shows a perspective illustration of the internal design of a battery cell according to the present invention, FIG. 3 shows a schematic illustration of a porous structure between a current collector element (substrate) of a negative electrode and a separator, FIG. 4 shows an enlarged detail illustration from FIG. 3, FIG. 5 shows a schematic detail illustration of a porous structure which comprises two fractions having different average particle sizes, FIG. 6 shows a schematic detail illustration of a porous structure which contains a solid salt in addition to the structure-forming particles.

Figure 2:
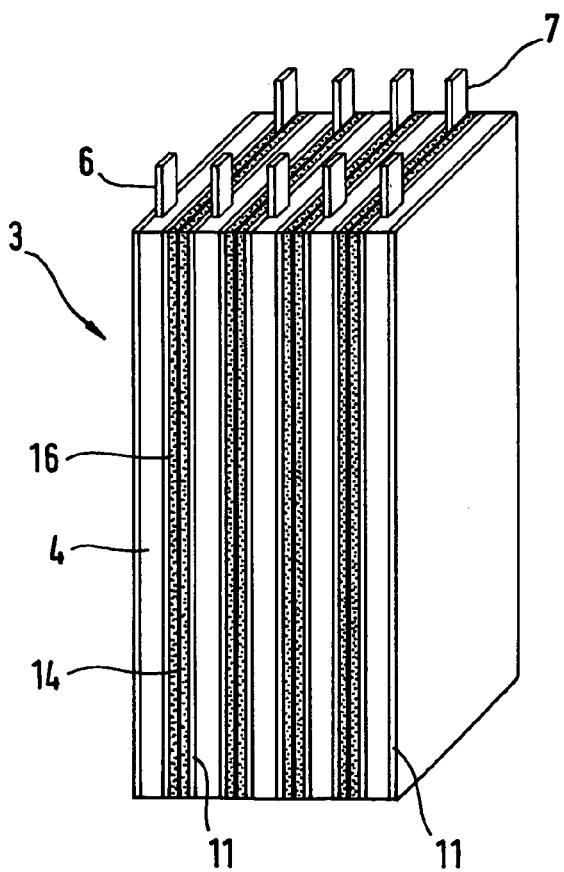

The housing 1 of the battery 2 illustrated in FIG. 1 is made of stainless steel, for example, and encloses the electrode arrangement 3 illustrated in FIG. 2, which comprises a plurality of positive electrodes 4 and negative electrodes 5. The electrodes 4,5 are—as is standard practice in battery technology—connected via electrode terminals 6,7 to corresponding terminal contacts 9,10 of the battery, the negative contact 10 being formed by the housing 1.

The electrodes 4,5 are shaped in the usual manner as sheets, i.e. as layers having a low thickness in relation to their area dimension. They are separated from each other by separators 11. In the preferred embodiment shown, the positive electrodes are covered on both sides by two layers 11*a*, 11*b* of the separator material. The area dimension of the two layers 11*a*, 11*b* is somewhat larger than the area of the positive electrodes, and they are connected to one another on their projecting edges using, for example, a peripheral adhesive layer 13 which is shown only schematically. In this manner, the positive electrodes 4 are completely enclosed by the separators 11.

The positive electrodes are preferably composed of an intercalation compound of a metal oxide, e.g. lithium cobalt oxide in the case of a lithium cell. The negative electrodes each have an electronically conductive substrate 14 as a current collector element, on which an active mass is electrolytically deposited during charging of the cell. The substrate 14 is very thin in comparison to the positive electrode 4 and is therefore shown as a dark line only. In practice it is preferably made of a porous metal structure, e.g. in the form of a perforated plate, lattice, metal foam, or expanded metal.

A porous structure 16 made of solid particles 17, which is more clearly recognizable in FIGS. 3 and 4, is in contact with the substrate 14 of each of the negative electrodes 5. It is sufficiently hard and compact that the solid particles are fixed immovably therein. The active mass 15 (only shown in FIG. 4) which is electrolytically deposited on the surface of the substrate 14, penetrates into its pores 18 and is further deposited uniformly therein, so that it gradually displaces the electrolyte 19 out of the pores 18. The contact area 20 between the electrolyte and the active mass is very small because it is restricted to the narrow pores 18 of the porous structure 16.

The porous structure 16 is formed and positioned in such a manner that no accumulations of the active mass 15 can form in cavities which are significantly larger than the pores of the porous structure. The porous structure 16 does not form a composite with either the substrate 14 or the separator 11 in such a manner that the layers adhere to one another (without the effect of external forces). Therefore cavities can exist or arise during operation of the cell between the substrate 14 and the porous structure 16, between the porous structure 16 and the separator 11, and within the porous structure 16 itself. In order to avoid formation of such cavities, the intermediate space 21 between the substrate 14 and the separator 11 should be filled up so completely that no cavities remain which are significantly larger than the pores of the porous structure and in which accumulations of the active mass deposited during the charging process could form.

The porous structure can be manufactured by pouring the solid particles into the cell as a dry, pourable powder. The solid particles may then be compacted by striking, shaking, or stamping in order to achieve the desired volume filling proportion. Although it is in principle sufficient to fill the intermediate space 21 between the substrate 14 and the separator 11, it is advantageous in practice if all cavities existing in the cell are filled. For this reason, in the cell illustrated in FIG. 1, the porous structure 16 is also provided in the space above the electrode arrangement 3.

In order to ensure a sufficient layer thickness of the porous structure 16, spacers, e.g. in the form of plastic strips, may be used, which a define a distance between the substrate layers 14 and the separator layers 11 before the pouring. The spacers may be removed after a first partial quantity of the solid particles is poured in, but a design in which spacer elements (e.g., fiberglass lattices) remain in the cell is also possible.

According to an alternative method of introducing the porous structure 16 into the cell, a suspension of the solid particles 17 in a volatile liquid is first poured into the cell and the liquid is thereafter removed (using vacuum and/or elevated temperature).

According to a further method variation, the solid particles 17 can be processed using a binder material, such as methylcellulose, with the addition of a liquid, into a pasty mass. This pasty mass can be placed between the substrate 14 and the separator 11 during the assembling of the electrode arrangement 3 outside the cell housing. The binder can be removed from the layer, for example by heating. In contrast to a binder which remains in the cell, this binder does not have to be inert.

FIG. 5 shows the earlier mentioned preferred embodiment, in which, to increase the volume filling proportion, two fractions of structure-forming solid particles 23,24 are used. The particle sizes of the two fractions supplement one another in such a manner that the particles 24 of the finer fraction fit into the spaces 25 between the particles of the coarser fraction. The ratio of the average particle sizes of the two fractions is preferably between approximately 1:6 and 1:2, ratios between 1:5 and 1:3 being especially preferred.

Of course, more than two fractions can also be used, for example in such a manner that the particles of a medium fraction fit into the spaces between the particles of a coarsest fraction and the particles of the finest fraction fit into the spaces of the medium fraction.

In practice the particle size is selected by screening. The particle size is therefore defined by the hole size of the screen used. The average particle size is defined by the average of the size distribution curve of the fraction.

An especially preferred embodiment in which the porous structure 16 contains a solid salt 26 is illustrated in FIG. 6. The salt 26 is preferably contained in the porous structure 16 in the form of finely divided particles 27, the salt particles 27 being so much smaller than the structure-forming solid particles 17 that the salt particles fit into the pores 18 of the porous structure 16. The salt particles 27 are preferably very much smaller than the structure-forming particles 17.

In general, the average particle size of suitable structure-forming particles is between approximately 10 μm and approximately 200 μm, values between 50 μm and 150 μm being especially preferred. The ratio of the average particle size of the salt to the average particle size of the structure-forming particles 17 should be less than 1:2, preferably less than 1:4, and especially preferably less than 1:8. If the porous structure 16 contains a plurality of particle fractions, the arithmetic mean of their average particle sizes, weighted according to the proportions of the particle fractions, is to be used for this comparison.

The proportion of the salt particles to the total volume of the solid substances of the porous structure should be small. Preferably, the total volume of the salt particles is at most 20%, preferably at most 10%, and especially preferably at most 5% of the total solid volume of the porous structure.

The salt is preferably an alkali halogenide. LiF, NaCl, or LiCl, LiF are especially preferred. The advantageous effect of a solid salt in contact with the current collector element of the negative electrode of an electrochemical cell is known from WO 00/44061. Details concerning the safety-relevant effect of the salt can be taken from this document. In the context of the present invention, it has been determined that the safety of the cells is even substantially better if the loose bed of salt grains provided according to WO 00/44061 is replaced by a compact porous structure made of non-ionic inert particles and within this porous structure a substantially smaller amount of salt is used.

EXAMPLES

For the experimental testing of the present invention, a battery cell as shown in FIGS. 1 and 2, having an electrode area dimension of approximately 70×40 mm and the electrochemical system Li|$SO_2$|$LiCoO_2$ was used. A quantity of lithium equivalent to 250 mAh was deposited on the negative electrode during charging.

The cell (in particular the intermediate space between the substrate of the negative electrode and the separator) was filled with a mixture made of two fractions of SiC having particle size ranges defined by screening. Furthermore, an additive of LiF was used. The component parts were dried, mixed, and poured into the cell in the following quantity ratios:

70% SiC particle size 90-125 μm
28% SiC particle size 25-32 μm
2% LiF particle size <5 μm The resulting volume filling proportion was approximately 60%.

a) Needle Test

The cell was charged. Subsequently, an artificial internal short-circuit was caused using a needle stuck through the electrode (needle test).

Result: During charging the deposited lithium grew very uniformly into the layer of the porous structure. No "growing through" up to the separator was observed. During the short-circuit only a local reaction was detected in the region of the needle tip. The reaction did not progress into other regions of the electrode and no flame front occurred. The reaction came to a stop within approximately two seconds. Practically no development of smoke was observed.

This shows outstanding safety behavior in case of a short-circuit.

b) Reaction at Elevated Temperature

Charged cells with the same design as in example a), but with a capacity of 2 Ah, were heated in an oven while monitoring the cell temperature. The oven temperature was kept constant at 60° C.

The temperature of cells designed according to the present invention rose, after reaching a critical temperature just below 60° C., further to approximately 80 to 90° C. because of a reaction occurring in the cell. Then the cells cooled back down to the ambient temperature. After this oven test, they were dischargeable at over 50% of the original charge capacity.

In contrast, in cells without the safety concept of the present invention, a more rapid temperature increase from approximately 60° C., caused by a thermal runaway inside the cell, was observed. All of the lithium in the cell reacted violently, the burst safety valve being opened in many cases and electrolyte reaching the outside. The cells were unusable after the test.

Therefore, the high-temperature behavior of the cell according to the present invention is also decisively improved.

The invention claimed is:

1. Rechargeable electrochemical battery cell having a negative electrode, an electrolyte based on sulfur dioxide, and a positive electrode, the negative electrode comprising an electronically conductive substrate on which an active mass is electrolytically deposited when charging the cell, wherein
   the battery cell comprises a porous structure contacting the substrate of the negative electrode,
   the porous structure is determined by the size and shape of structure-forming solid particles, the material of which is not an ionically dissociating material, and is inert relative to the electrolyte, its overcharge products, and the active mass,
   the volume proportion of the solid particles in the porous structure is at least 40%, and
   the porous structure is formed and positioned in such a manner that the active mass deposited during charging of the cell penetrates from the surface of the substrate into its pores and is further deposited therein,
   wherein the porous structure is made of solid particles which are not bonded to one another or are bonded to one another by a binder.

2. Battery cell according to claim 1, characterized in that, in order to increase the bulk density, the shape of the solid particles (17) which form the porous structure (16) approximates a spherical shape.

3. Battery cell according to claim 1, characterized in that the porous structure (16) contains at least two fractions of structure-forming solid particles (23,24) having different average particle sizes and the particle sizes of the fractions are adapted to one another in such a manner that an increased volume proportion of the particles results.

4. Battery cell according to claim 1, characterized in that the substrate (14) is sheet-shaped and is positioned parallel to a sheet-shaped separator (11) which separates the negative electrode from a positive electrode, and the porous structure (16) completely fills the space between the substrate (14) and the separator (11) in such a manner that there are no cavities in which accumulations of the mass (15) deposited during charging the cell could form and which are substantially larger than the pores (18) of the porous structure (16).

5. Battery cell according to claim 1, characterized in that the material is a ceramic powder.

6. Battery cell according to claim 1, characterized in that the solid particles of the porous structure have a melting point of at least 200° C.

7. Battery cell according to claim 1, characterized in that the material of the solid particles of the porous structure has a thermal conductivity of at least 5 W/mK.

8. Battery cell according to claim 1, characterized in that the solid particles (17) of the porous structure (16) contain an oxygen-free compound, selected from the group consisting of a carbide, nitride, and phosphide.

9. Battery cell according to claim 8, characterized in that the solid particles (17) contain a carbide, nitride, or phosphide of silicon.

10. Battery cell according to claim 1, characterized in that the porous structure (16) contains a solid salt (26).

11. Battery cell according to claim 10, characterized in that the solid salt (26) is contained in the porous structure (16) in the form of finely divided particles (27), the salt particles (27) being so much smaller than the solid particles (17) of which the porous structure (16) is made that the salt particles fit into the pores (18) of the porous structure (16).

12. Battery cell according to claim 11, characterized in that the size ratio of the average particle size of the salt particles to the average particle size of the solid particles of which the porous structure is made is less than 1:2.

13. Battery cell according to claim 11, characterized in that the proportion of the total volume of the salt particles to the total solid volume of the porous structure (16) is at most 20%.

14. Battery cell according to claim 1, characterized in that the active mass is selected from the group consisting of the alkali metals, the alkaline earth metals, and the metals of the second subgroup of the periodic system.

15. Battery cell according to claim 14, characterized in that the active mass (15) is lithium, sodium, calcium, zinc, or aluminum.

16. Battery cell according to claim 1, characterized in that the positive electrode (4) contains a metal oxide.

17. Battery cell according to claim 16, characterized in that the positive electrode (4) contains an intercalation compound.

18. Battery cell according to claim 1, characterized in that the volume proportion of the solid particles in the porous structure is at least 50%.

19. Battery cell according to claim 1, characterized in that the volume proportion of the solid particles in the porous structure is at least 55%.

20. Battery cell according to claim 1, characterized in that the solid particles of the porous structure have a melting point of at least 400° C.

21. Battery cell according to claim 1, characterized in that the material of the solid particles of the porous structure has a thermal conductivity of at least 20 W/mK.

22. Battery cell according to claim 11, characterized in that the size ratio of the average particle size of the salt particles to the average particle size of the solid particles of which the porous structure is made is less than 1:4.

23. Battery cell according to claim 11, characterized in that the size ratio of the average particle size of the salt particles to the average particle size of the solid particles of which the porous structure is made is less than 1:8.

24. Battery cell according to claim 11, characterized in that the proportion of the total volume of the salt particles to the total solid volume of the porous structure is at most 10%.

25. Battery cell according to claim 11, characterized in that the proportion of the total volume of the salt particles to the total solid volume of the porous structure is at most 5%.

26. Battery cell according to claim 1, wherein the building of the porous structure does not include an in situ forming of a composite with the substrate of the negative electrode.

27. A battery cell according to claim 1, wherein the solid particles of the porous structure are bonded to one another by a binder, and wherein the volume proportion of the binder to the total solid volume of the porous structure is at most 50%.

28. A battery cell according to claim 27, wherein the volume proportion of the binder to the total solid volume of the porous structure is at most 30%.

29. A battery cell according to claim 28, wherein the volume proportion of the binder to the total solid volume of the porous structure is at most 20%.

30. A battery cell according to claim 29, wherein the volume proportion of the binder to the total solid volume of the porous structure is at most 10%.

* * * * *